United States Patent Office 2,912,400
Patented Nov. 10, 1959

2,912,400

VINYL RESIN PLASTISOL CONTAINING PLASTICIZER AND BORON ESTER

Harold M. Olson, Hudson, Ohio

No Drawing. Application April 4, 1957
Serial No. 650,567

3 Claims. (Cl. 260—29.1)

This invention relates to vinyl resin dispersions and, more particularly, to vinyl resin dispersions containing boron esters. Such dispersions are suspensions of vinyl chloride resins in nonaqueous liquids which do not dissolve the resin at ordinary temperatures. If the liquid phase consists only of plasticizer, the dispersion is termed a "plastisol," whereas, if the dispersing liquid contains in addition to plasticizer volatile components such as aliphatic and aromatic hydrocarbons, the dispersion is termed an "organosol."

One of the problems existing with dispersion resins of the vinyl chloride type is that of increasing viscosity after the initial formulation or preparation of the resin dispersion. In general, the resinous dispersions tend to increase in viscosity upon standing after preparation. This is believed caused by the swelling, gelling, or partial solution of the resin in the plasticizer. This increase in viscosity is undesirable in most application situations since usually the viscosity is an important factor in the application method. Another problem which exists, most particularly in the case of plastisols, relates to the release of air from the dispersion formulation. After the initial preparation of the formulation by milling or mixing of the resin into the plasticizer (and/or other diluents and dispersants in the case of organosols) the air incorporated is usually removed by subjecting the formulation to a vacuum. However, during subsequent processing of the dispersions, as, for example, in slush molding operations with plastisols, there is a considerable quantity of air incorporated in the dispersion which must be dispelled prior to the baking of the resin. This is usually accomplished by merely letting the air work its own way out of the resin and, of course, is time consuming.

It has been discovered that by incorporating boron esters in vinyl resin dispersion lower viscosities are obtained after standing for several hours, and that the resins have a slower rate of increase in viscosity than normal. Thus, it is possible to make up larger batches of the resins without the danger of their becoming too viscous for use if normal production delays are encountered. Additionally, the boron esters aid in the release of air from the dispersions. This is especially important in those operations wherein a mold is inactivated until the air has been dispelled since the boron esters facilitate quicker processing.

Accordingly, it is an object to provide for new compositions of matter of the vinyl resin dispersion types having incorporated boron esters.

Another object is to provide for new vinyl dispersions containing boron esters and characterized by having greater air release properties than such compositions without the boron ester.

Boron esters employed have been characterized by the following formula:

B(OR)$_3$ wherein "R" is selected from the group consisting of cyclohexyl and phenyl radicals, chloryl, aryl, and alkyl substituted cyclohexyl and phenyl radicals and alkyl and alkenyl radicals having from 2 to 20 carbon atoms. Suitable boron esters are exemplified by tri-n-amyl borate, tri-2-ethylhexyl borate, tri-n-dodecyl borate, tri-o-cresyl borate, tri-m,p-cresyl borate, tri-oleyl borate, tri-phenyl borate, tri-2-phenyl cyclohexyl borate, tri-o-chlorophenyl borate.

To impart the desired properties to the vinyl resin dispersions the boron esters are employed in amounts ranging from about .1 to about 10 parts by weight of boron ester per hundred parts of vinyl chloride resin. Optimum quantities range from about 0.5 to about 4 parts of the boron ester per 100 parts of the vinyl chloride resin. The tri-cresyl borates are preferred since they tend to impart added heat stability as well as facilitating the release of air and acting to control the viscosity.

Although the principal benefits derived from the use of the boron esters reside in permitting the maintenance of lower viscosities and in the function that they play in the release of air, it has been found that many of the boron esters impart additional clarity to the resinous products and in many cases impart added heat and light stability thereto.

In the preparation of the formulations containing the boron esters, the esters may be milled or mixed into the dispersion simultaneously with the milling of the resin into the plasticizer and/or added diluents or dispersants. Other suitable methods for incorporating the boron esters in the vinyl dispersions of either the organosol or plastisol type will be evident to those skilled in the art.

Liquid plasticizers which are conventionally employed in vinyl dispersion resins are dibutyl phthalate, di-isooctyl adipate, dicapryl phthalate, di-(2,ethylhexyl) hexahydrophthalate, tri-ethylene glycol di(2,ethylhexoate), tri(2,ethylhexyl) phosphate, di(2,ethylhexyl) azelate, butyl benzoate, butyl benzyl phthalate, methylphthalyl ethyl glycollate, tri-cresyl phosphate, triphenyl phosphate and petroleum oils. The plasticizers together with suitable dispersants and diluents when appropriate are employed in at least sufficient quantities to carry the resins in the dispersed state as is evident. It will also be apparent that certain of the stabilizers (heat and light) are liquids and that such liquids when incorporated in the resinous dispersions act also as plasticizers and may be considered as such herein. On the other hand, the solid stabilizers employed are usually held in suspension in the dispersed resinous compounds as is the resin itself. Stabilizers such as the metal soaps well known to those skilled in the art, and the phosphites and phosphates are employed usually in amounts ranging from about 1 to about 10 parts by weight of 100 parts of resin.

Specific formulations which have been prepared together with information relating to the effect of the boron esters on the viscosity and air release properties of the plastisol vinyl dispersions are set forth in the following table. There is also set forth therein information with respect to the heat stability of films prepared for the indicated formulation.

The formulations were prepared by intimately mixing the indicated ingredients in a Hobart mixer conventionally employed for mixing plastisols, the dispersing and mixing of the resin being conducted for a period of one hour. Thereafter, the air was removed from the dispersion by subjecting it to a vacuum for about 15 minutes. Thereafter, the air release information and viscosity data were obtained.

| Formulation No. | 1 | 2 | 3 | 4 | 5 | 6 | 7 | 8 | 9 | 10 |
|---|---|---|---|---|---|---|---|---|---|---|
| Polyvinyl chloride resin | 100 | 100 | 100 | 100 | 100 | 100 | 100 | 100 | 100 | 100 |
| Dioctyl phthalate | 60 | 60 | 60 | 60 | 60 | 60 | 60 | 60 | 60 | 60 |
| Epoxidized Soy Bean Oil | 5 | 5 | 5 | 5 | 5 | 5 | 5 | 5 | 5 | 5 |
| Barium laurate | 1.6 | 1.6 | 1.6 | 1.6 | 1.6 | 1.6 | 1.6 | 1.6 | 1.6 | 1.6 |
| Cadmium laurate | .9 | .9 | .9 | .9 | .9 | .9 | .9 | .9 | .9 | .9 |
| Tri-phenyl phosphite | .35 | .35 | .35 | .35 | .35 | .35 | .35 | .35 | .35 | .35 |
| Tri-isooctyl phosphite | .35 | .35 | .35 | .35 | .35 | .35 | .35 | .35 | .35 | .35 |
| (Boron Esters): | | | | | | | | | | |
| Tri-n-amyl borate | | 1 | | | | | | | | |
| Tri-2-ethylhexyl borate | | | 1 | | | | | | | |
| Tri-n-dodecyl borate | | | | 1 | | | | | | |
| Tri-o-cresyl borate | | | | | 1 | | | | | |
| Tri-m,p-cresyl borate | | | | | | 1 | | | | |
| Tri-oleyl borate | | | | | | | 1 | | | |
| Tri-phenyl borate | | | | | | | | 1 | | |
| Tri-2-phenyl cyclohexyl borate | | | | | | | | | 1 | |
| Tri-o-chlorophenyl borate | | | | | | | | | | 1 |
| (Viscosity) cps.: | | | | | | | | | | |
| 1 hr. after preparation | 14,000 | 16,000 | 15,000 | 14,200 | 15,500 | 15,500 | 13,000 | 15,000 | 11,000 | 11,000 |
| 24 hrs. after preparation | 30,000 | 19,500 | 15,800 | 11,800 | 12,000 | 12,000 | 12,000 | 17,000 | 18,500 | 12,500 |
| (Air Release) sec.: | | | | | | | | | | |
| 1 hr. after preparation | 16 | 14 | 13 | 12 | 11 | 10 | 11 | 11 | 10 | 10 |
| 24 hrs. after preparation | 24 | 22 | 15 | 15 | 12 | 12 | 13 | 16 | 11 | 13 |
| (Heat Stability): Minutes at 350° F. to discoloration | 45 | 45 | 50 | 50 | 60 | 60 | 45 | 45 | 45 | 40 |

The viscosity determinations set forth in the table were developed at 73° F. by using a number 4 spindle on a Brookfield L.V. Viscosimeter and are reported in centipoise.

The air release information set forth in the table was obtained by injecting 0.2 cc. of air, ¾″ below the surface of a beaker containing a sample of the dispersion formulation, the air being injected into the dispersion by means of the syringe. The time reported is the time measured from the point in time when the bubble of air reached the surface of the formulation, to the point in time when the bubble broke.

The reported heat stability information was obtained by casting 75 mils samples of each formulation which were then baked at 350° F. for 15 minutes. Thereafter, individual samples of each formulation were subjected to a temperature of 350° F. and the length of time determined before the sample began to discolor.

It will be noted by comparing the control Formulation No. 1 with Formulations Nos. 2 through 10 that the viscosity of the plastisol dispersions increased somewhat with most boron esters during the first hour after preparation. However, it will also be noted that after 24 hours the boron ester containing formulations had a substantially lower viscosity than the control fomulation. This clearly indicates the suppressing effect of the boron esters on the viscosity. The benefits of the boron esters in causing air release from the dispersion resins is evident similarly by comparing the control Formulation No. 1 with the balance of the formulations set forth in the table containing a boron ester. In each case there was a substantial decrease in the time required for the air to be released from the dispersion resin. In actual practice the boron esters have been found to be highly suitable as air releasing agent in slush molding and other types of operations wherein release of entrained air is essential.

It will also be noted from the respective formulations that several of the boron esters have the advantageous property of increasing the heat stability of the resinous films produced therefrom.

It will be apparent that although dioctyl phthalate and epoxidized soy bean oil set forth as exemplifying plasticizers which are used in the formulations that other plasticizers may be employed as well.

Although reference has been made herein principally to vinyl chloride resin, it will be apparent that in addition to vinyl chloride polymers that copolymers thereof wherein the vinyl chloride is the predominant resinous component may also be employed. Thus, it is contemplated that those copolymers containing vinyl chloride as the predominant resinous constituent and which are conventionally employed in vinyl dispersion may also be employed. Thus, vinylidines, vinylacetate and diethyl maleates copolymers of vinyl chloride may be employed.

I claim:

1. A vinyl plastisol consisting of a vinyl resin selected from the class consisting of vinyl chloride homopolymers, vinyl chloride-vinyl acetate copolymers, and vinyl chloride-di-ethyl maleate copolymers, a plasticizer and from 0.1 to about 110 parts per 100 parts of resin of a boron ester selected from the group consisting of tri-n-amyl borate, tri-2-ethylhexyl borate, tri-n-dodecyl borate, tri-o-cresyl borate, tri-m,p-cresyl borate, tri-oleyl borate, tri-phenyl borate, tri-2-phenylcyclohexyl borate, tri-o-chlorophenyl borate.

2. A vinyl plastisol according to claim 1 wherein said boron ester is present in amounts ranging from about 0.5 to about 4 parts per 100 parts of resin.

3. A vinyl plastisol according to claim 1, wherein said plasticizer is selected from the group consisting of dibutyl phthalate, diisooctyl adipate, dicapryl phthalate, di(2,ethylhexyl) hexahydrophthalate, tri-ethylene glycol di(2,ethylhexoate), tri(2,ethylhexyl) phosphate, di(2,-ethylhexyl) azelate, butyl benzoate, butyl benzyl phthalate, methylphthalyl ethyl glycollate, tricresyl phosphate and triphenyl phosphate.

References Cited in the file of this patent

UNITED STATES PATENTS 2,278,231   Wright _____ Mar. 31, 1942

FOREIGN PATENTS 541,597   Great Britain _____ Dec. 3, 1941

UNITED STATES PATENT OFFICE
CERTIFICATE OF CORRECTION

Patent No. 2,912,400 November 10, 1959

Harold M. Olson

It is hereby certified that error appears in the printed specification of the above numbered patent requiring correction and that the said Letters Patent should read as corrected below.

Column 4, line 41, for "110 parts" read -- 10 parts --.

Signed and sealed this 26th day of April 1960.

(SEAL)
Attest:
KARL H. AXLINE
Attesting Officer

ROBERT C. WATSON
Commissioner of Patents